UNITED STATES PATENT OFFICE.

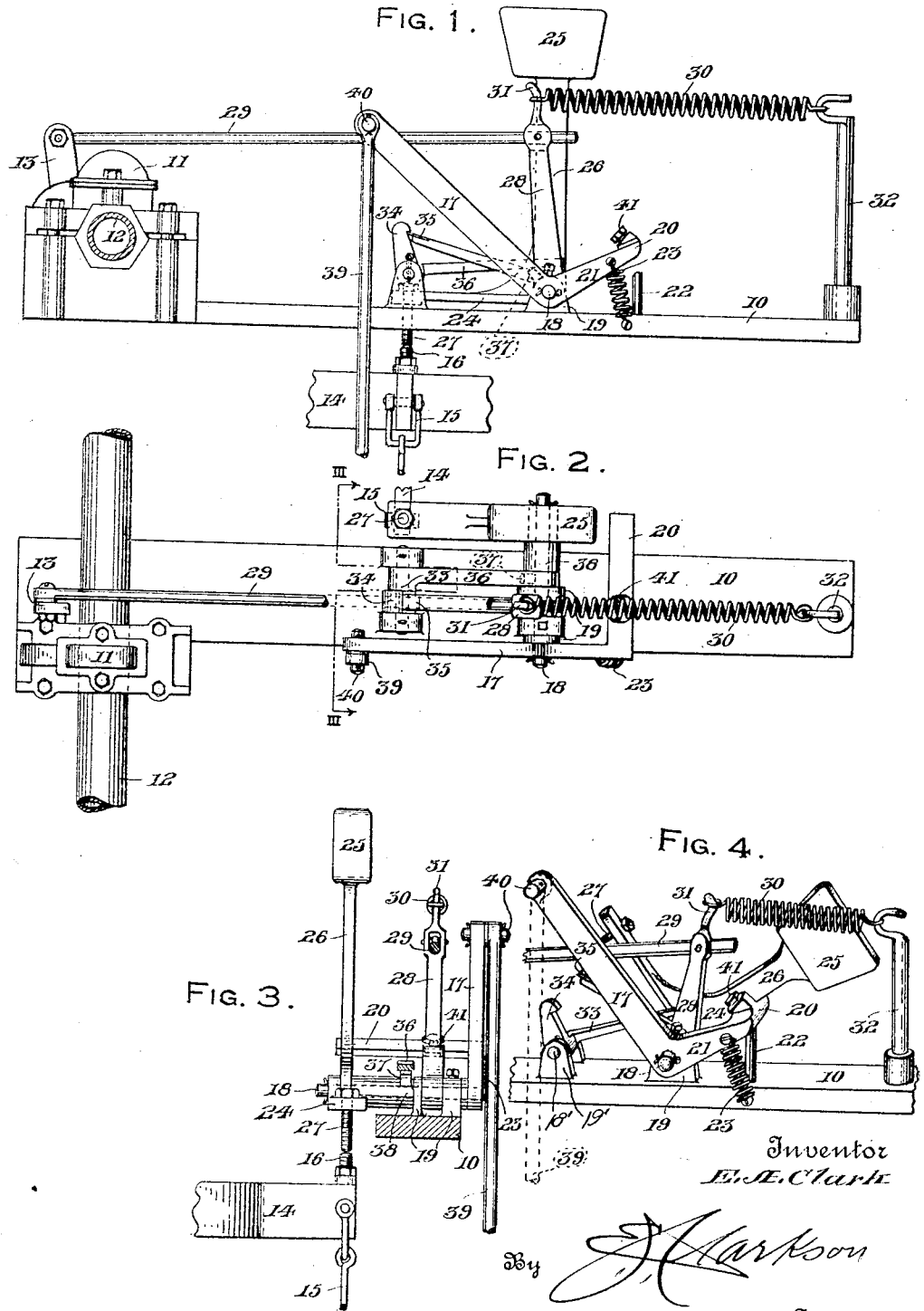

ELMER A. CLARK, OF JOLIET, ILLINOIS.

AUTOMATIC TRIP MECHANISM.

1,397,857.     Specification of Letters Patent.     Patented Nov. 22, 1921.

Application filed January 30, 1919. Serial No. 274,138.

*To all whom it may concern:*

Be it known that I, ELMER A. CLARK, a citizen of the United States, residing at Joliet, in the county of Will and State of Illinois, have invented certain new and useful Improvements in Automatic Trip Mechanism, of which the following is a specification.

The primary object of the invention is the provision of an automatic control for such devices as different forms of valves and cut-offs, the same being delicate in operation for easily tripping at a predetermined time.

A further object of the invention is to provide an automatic shut-off for fluid adapted for actuation after a predetermined quantity thereof has passed a given point, the structure possessing great strength and utility.

A still further object of the invention is to provide automatic means for closing a fluid valve which supplies fluid to a weighing machine, the structure being such that when the desired weight of fluid has flowed into a certain position that the weighing means will trip the device for stopping the fluid flow.

My invention is adaptable for many uses and by way of example is herein illustrated associated with a standard quick-action valve and a weighing means, whereby the latter will automatically trip the invention for closing the valve after discharging a required amount of water for a particular use such as an amount necessary for a batch of bread.

With these general objects in view, the invention will now be fully described in connection with the accompanying drawing in which like reference characters designate corresponding parts throughout the several views.

In the drawings,

Figure 1 is a side elevation of the invention with the valve open and mechanism in its set position, Fig. 2 is a top plan view thereof, Fig. 3 is a vertical sectional view taken upon line III—III of Fig. 2, and Fig. 4 is a perspective view of the invention in its normal tripped position as assumed when the valve is closed.

Referring more in detail to the drawings, a supporting member or beam 10 is illustrated having a standard quick-action valve 11 mounted thereon controlling the flow of water through a pipe 12, the said valve having an operating lever 13 for opening and closing the valve to control the flow of water through the pipe 12.

A portion of a supporting yoke 14 for a receptacle, not shown, is illustrated having a link means 15 adapted to be connected to a weighing means, not shown, and whereby the shifting of the weighing means upon the supplied water reaching the desired weight is to elevate the member 14 and a pin 16 carried thereby. The said valve 11 is of the usual construction while the weighing means for the water supplied from the valve is that which is ordinarily employed for an automatic water-weighing and measuring tank for baker's use in bread making.

A setting lever 17 in the shape of a right angle is journaled upon a shaft 18 carried by spaced brackets 19 upon the beam 10, a lateral off-set 20 upon the shorter end 21 of the set lever being normally seated by means of a spring 23 upon a stop 22 carried by the beam 10.

A right angular trip lever 24 is journaled upon the opposite end of the shaft 18 from the set lever 17 and has a weight 25 upon the longer arm 26 thereof which arm 26 normally rests upon the aforementioned lateral off-set 20. An adjustable pin 27 is carried through the other arm of the lever 24 adapted for resting upon the pin 16 when the device is in its set position with the arm 26 vertically arranged.

A latch lever 28 is journaled upon the shaft 18 between the brackets 19 with its upper end pivotally connected adjacent the free end of the valve lever 13 by a rod 29. An operating spring 30 connects an extension 31 of the lever 28 with a post 32 upon the beam 10, the function of the spring 30 being to normally maintain the lever 13 in a position with the valve 11 closed, such position of the mechanism being illustrated in Fig. 4 of the drawings.

A hook lever 33 is also journaled upon a shaft 18' mounted in brackets 19' and has a hook 34 adapted to overlie the free end 35 of the latch lever 28 when the valve 11 is open as shown in Fig. 1 of the drawings and at which time the other arm 36 of the hook lever 33 rests upon a lug 37 of the trip lever 24.

The operation of the invention will be apparent from this detail description thereof, it being noted that a pull or setting rod 39 is pivoted as at 40 to the free end of the set lever 17 and that the elements are normally positioned as shown in Fig. 4 of the drawings with the valve 11 closed. When desired to weigh a quantity of water and to have the valve 11 close for stopping the flow through the pipe 12, the rod 39 is pulled downwardly swinging the said lever 17 upon the shaft 18. This movement elevates the trip lever 24 and also engages an adjustable abutment 41 upon the off-set 20 against the latch 28 and turns the latch upon the shaft 18 to longitudinally move the rod 29 and open the valve 11 against the action of the spring 30. The turning of the hub 38 so positions the lug 37 that the hook lever 33 swings for engaging the hook 34 with the end 35 of the latch 28. The latch 28 is maintained in this position with the valve 11 open by means of the hook 34 and with the arm 36 of the hook lever 33 resting upon the depressed lug 37, it being understood that the pin 27 of the trip lever 24 is seated upon the pin 16 of the weighing mechanism while the arm 26 is vertically positioned with the weight 25 substantially balanced.

When the required weight of water has been reached, the weighing mechanism elevates the pin 16 which moves the pin upwardly causing the weight 25 to quickly tilt the trip lever 24 to its reclining position against the off-set 20, it being noted that the spring 23 has automatically returned the set lever 17 to its normal position as shown in Fig. 4 after the setting of the mechanism with the valve 11 open. The action of the lug 37 against the lever arm 36 releases the hook 34 from the latch 35 and permits the spring 30 to draw the latch 28 to its normal position as shown in Fig. 4 quickly closing the valve 11 and shutting off the supply of water in the pipe 12. The mechanism then remains idle with the valve 11 closed and the mechanism positioned as shown in Fig. 4 until again desired for actuation and whereupon the mechanism is again set by means of the pull rod 39 in the manner heretofore described. The device is positive in its actuation and fully performs the objects for which it is designed.

What I claim as new is:—

1. Automatic trip mechanism comprising an operating rod, a latch attached to said rod, an anchored spring for said latch adapted for holding the rod in its normal position, a hook lever adapted for restrainingly engaging said latch when the rod is in a shifted position with the spring under tension, a weight actuated trip lever operatively associated with said hook lever, means adapted for engaging said trip lever at a predetermined time whereby the trip lever is over-balanced for shifting and releasing the hook lever for the return of the operating rod to its normal inoperative position, a pivoted set lever, a pull member attached to one end of the set lever, an off-set at the other end of the set lever adapted for engaging and shifting the trip lever and latch to their set positions upon the movement of the set lever and means adapted to automatically return the set lever to its normal position when released.

2. In combination with an operating lever, a pivot shaft, an angular latch journaled upon said shaft, a rod pivotally connected between one end of said latch and said lever, a spring attached to said end of the latch for normally positioning the rod with said lever in its normal position, a hook lever journaled adjacent said shaft having a hook end and a lever end, the other end of the latch being adapted for engagement beneath the hook end of the hook lever when the latch is in its set position with the rod and operating lever in a shifted position, a trip lever journaled upon said shaft having a hub and projecting arms, a lug upon said hub upon which said lever end of the hook lever is adapted to rest when the device is set, a balancing weight upon one arm of the trip lever adapted for shifting the trip lever and elevating the lug and lever end of the hook lever for releasing the hook from the latch when the device is tripped and means adapted for trippingly engaging the other arm of the trip lever at a predetermined time.

3. In combination with an operating lever, a pivot shaft, an angular latch journaled upon said shaft, a rod pivotally connected between one end of said latch and said lever, a spring attached to said end of the latch for normally positioning the rod with said lever in its normal position, a hook lever journaled adjacent said shaft having a hook end and a lever end, the other end of the latch being adapted for engagement beneath the hook end of the hook lever when the latch is in its set position with the rod and operating lever in a shifted position, a trip lever journaled upon said shaft having a hub and projecting arms, a lug upon said hub upon which said lever end of the hook lever is adapted to rest when the device is set, a balancing weight upon one arm of the trip lever adapted for shifting the trip lever and elevating the lug and lever end of the hook lever for releasing the hook from the latch when the device is tripped, means adapted for trippingly engaging the other arm of the trip lever at a predetermined time, a set lever journaled upon said shaft having an off-set having a path of movement in the planes of said latch and trip levers with the trip lever normally positioned upon said off-set when the device is at rest, a pull rod for operating said set lever and automatic means for returning the set lever to its normal position when the pull rod is released.

4. A device of the class described comprising in combination with a valve having an operating lever, a latch operatively connected to said lever, normal positioning means for said latch, an engaging hook for the latch, a trip for said hook, a balancing weight for the trip and means adapted for engaging said trip at a predetermined time whereby said weight moves the trip for releasing the hook to allow the latch to move upon the automatic return of the valve lever to its normal closed position.

In testimony whereof I affix my signature in the presence of two witnesses.

ELMER A. CLARK.

Witnesses:
BESSIE CONNORS,
E. V. MALONEY.